United States Patent Office.

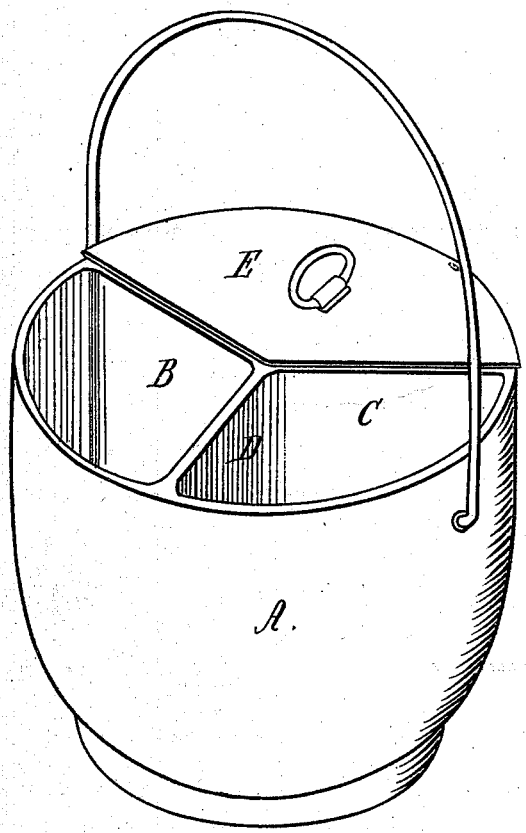

CARRIE JESSUP, OF NEW HAVEN, CONNECTICUT.

Letters Patent No. 112,352, dated March 7, 1871.

IMPROVEMENT IN CULINARY VESSELS.

The Schedule referred to in these Letters Patent and making part of the same.

*To all whom it may concern:*

Be it known that I, CARRIE JESSUP, of New Haven, in the county of New Haven and State of Connecticut, have invented a new Improvement in Cooking Utensils; and I do hereby declare the following, when taken in connection with the accompanying drawing and the letters of reference marked thereon, to be a full, clear, and exact description of the same, and which said drawing constitutes part of this specification and represents a perspective view.

This invention relates to an improvement in cooking utensils such as are used for boiling or stewing, the object being the construction of a kettle with two or more divisions, so that different articles may be cooked at the same time in a single kettle; and The invention consists in dividing the kettle into two or more compartments, provided with covers to cut off the connection between the compartments.

A is the kettle, in shape and construction, to adapt it to use upon the stove or range, similar to the kettles in common use.

The interior of the kettle is divided into compartments, (here represented as three,) with partitions B C D, each extending up to the top of the kettle, and each compartment provided with its own independent cover E to prevent the steam from one part communicating to another.

By this construction different kinds of vegetables may be cooked in the same kettle.

I do not wish to be understood as broadly claiming the union of several vessels in one.

I claim as my invention—

The herein-described cooking utensil or boiler A, constructed with two or more compartments within the same vessel by the divisions B C, and each compartment provided with its independent cover E, as and for the purpose specified.

CARRIE JESSUP.

Witnesses:
A. J. TIBBITS,
J. H SHUMWAY.